United States Patent
Joo

(10) Patent No.: US 9,000,330 B2
(45) Date of Patent: Apr. 7, 2015

(54) SHEET COMPOSITION FOR PIPE CONNECTION, AND SHEET FOR ELECTROFOAMING FUSION AND CONNECTING APPARATUS FOR UNDERGROUND PIPES USING THE SHEET COMPOSITION

(76) Inventor: Soo Young Joo, Seongnam-si (KR)

( * ) Notice: Subject to any disclaimer, the term of this patent is extended or adjusted under 35 U.S.C. 154(b) by 352 days.

(21) Appl. No.: 13/520,740

(22) PCT Filed: Nov. 17, 2010

(86) PCT No.: PCT/KR2010/008126
§ 371 (c)(1),
(2), (4) Date: Jul. 5, 2012

(87) PCT Pub. No.: WO2011/083913
PCT Pub. Date: Jul. 14, 2011

(65) Prior Publication Data
US 2012/0273474 A1    Nov. 1, 2012

(30) Foreign Application Priority Data
Jan. 7, 2010    (KR) .................. 10-2010-0001406

(51) Int. Cl.
*H05B 1/00*    (2006.01)
*C08J 3/22*    (2006.01)
(Continued)

(52) U.S. Cl.
CPC ............. *C08J 3/226* (2013.01); *B29C 65/3428* (2013.01); *B29C 65/3452* (2013.01);
(Continued)

(58) Field of Classification Search
USPC ................ 219/201, 409; 521/93, 87, 134, 95; 285/337, 369; 156/148
See application file for complete search history.

(56) References Cited

U.S. PATENT DOCUMENTS 5,300,356 A    4/1994    Dempster et al.

FOREIGN PATENT DOCUMENTS

JP          2003253033 A      9/2003
KR    20-2000-0019277 U     11/2000
(Continued)

OTHER PUBLICATIONS

International Search Report issued in connection with the corresponding International Application No. PCT/KR2010/008126 on Aug. 25, 2011.
(Continued)

*Primary Examiner* — Shawntina Fuqua
(74) *Attorney, Agent, or Firm* — The H.T. Than Law Group

(57) ABSTRACT

The present invention relates to a connecting apparatus used for connecting underground pipes and to a composition for preparing a foamed sheet for the same. Specifically, the present invention relates to a sheet composition for pipe connection which comprises 1 to 10 parts by weight of a masterbatch including low-density polyethylene, high-density polyethylene, a maleic anhydride graft copolymer, a metallocene polyethylene elastomer, a foaming agent, and an additive, based on 100 parts by weight of a base resin including low-density polyethylene, high-density polyethylene, a maleic anhydride graft copolymer, and a metallocene polyethylene elastomer. When using the composition according to the present invention, a non-foamed sheet is produced during melt extrusion, and a foamed sheet is obtained at a high temperature by laminating the non-foamed sheet with a heater line and applying electricity thereto. Therefore, the sheet composition can be fused and filled into a pipe.

15 Claims, 5 Drawing Sheets

(51) Int. Cl.
- *B29C 65/34* (2006.01)
- *B29C 65/00* (2006.01)
- *C08L 23/04* (2006.01)
- *F16L 47/03* (2006.01)
- *C08J 9/00* (2006.01)
- *C08J 9/10* (2006.01)
- *B29C 44/12* (2006.01)
- *F16L 19/00* (2006.01)

(52) U.S. Cl.
CPC ........ *B29C 66/522* (2013.01); *B29C 66/81471* (2013.01); *B29C 66/8286* (2013.01); *B29C 66/91221* (2013.01); *C08L 23/04* (2013.01); *F16L 47/03* (2013.01); *B29C 66/91212* (2013.01); *B29C 66/91231* (2013.01); *B29C 66/91411* (2013.01); *B29C 66/91431* (2013.01); *B29C 66/91655* (2013.01); *C08J 9/0061* (2013.01); *C08J 9/103* (2013.01); *B29C 44/1228* (2013.01); *B29C 65/342* (2013.01); *B29C 65/344* (2013.01); *C08J 2423/00* (2013.01); *B29C 65/3476* (2013.01); *B29C 65/3468* (2013.01); *C08J 2201/03* (2013.01); *C08J 2323/06* (2013.01); *C08J 2451/06* (2013.01)

(56) References Cited

FOREIGN PATENT DOCUMENTS

| | | |
|---|---|---|
| KR | 10-2008-0057794 A | 6/2008 |
| KR | 10-2009-0095046 A | 9/2009 |

OTHER PUBLICATIONS

Machine Translation of JP 2003-253033 A.

SHEET COMPOSITION FOR PIPE CONNECTION, AND SHEET FOR ELECTROFOAMING FUSION AND CONNECTING APPARATUS FOR UNDERGROUND PIPES USING THE SHEET COMPOSITION

TECHNICAL FIELD

The present invention relates to a method for connecting two polyethylene sewer pipes by electrofusion. More specifically, the present invention relates to a sheet composition for pipe connection enabling complete sealing when foamed and fused, a method for a sheet for electrofoaming fusion using the same, and a connecting apparatus of underground pipes.

BACKGROUND ART

A connection band is wound around connection ends of two pipes constituting conventional sewer pipes or rain water pipes and is thus fused to the connection ends of pipes. Such a connection band is known to be made of a synthetic resin sheet such as polyethylene and be provided on the inner side surface thereof with heater lines arranged in the form of a zigzag and has a structure in which the connection bands are wound about the connection ends of two pipes and a part of connection bands is melted by heat-generation of heater lines and thus fused to the connection ends of the two pipes to be connected, when voltage is applied thereto. However, in a case of the connection band in the related art, the heater lines are heated and thus thermally expanded when voltage is applied to heater lines, disadvantageously, short-circuit occurs between the adjacent heater lines are, thus causing an inconvenience in which an applied voltage level and application time should be accurately kept, and a problem in which the connection bands are not uniformly fused throughout the pipes due to low thermal conductivity of the connection bands.

The polyethylene fusing sheet using a conventional electrofusion method operates according to a principle in which the outer surface of polyethylene sewer pipes and the polyethylene fusing sheet are melted and fused using electricity. Such a principle causes a water leakage, or an air gap in the process of overlapping the fusing sheet with the polyethylene sewer pipes, since tolerance of pipes to be connected cannot be overcome.

DISCLOSURE

Technical Problem

Therefore, it is one object of the present invention to provide a composition that exhibits superior foaming properties, adhesion and watertightness to reduce an acceptable tolerance generated in the process of producing polyethylene sewer pipes, difference in pipe diameter due to variation in pipe circularity generated during load transportation, and to fill an air gap of a double portion generated during mounting of the support sheet. Specifically, it is another object of the present invention to provide an excellent underground pipe sheet for electrofoaming fusion in which a sheet for foaming is foamed and fused to fuse the surface of pipe to the inside surface of the support sheet, and thus fills spaces and gaps formed therebetween with foams to realize airtight sealing, and provide complete watertightness and fuse-connection.

In addition, it is another object of the present invention to provide a connecting apparatus of underground pipes in which the sheet composition is melt-extruded to produce a sheet for foaming, and the sheet for foaming is laminated to the heater line and is foamed when electricity is applied to the heater line, and is then fused and adhered to polyethylene sewer pipes to seal the spaces.

Technical Solution

According to the present invention, a polyethylene sheet for foaming provided with a heater line is surrounded with a polyethylene support sheet, the heater line is connected to a power supply of a fusion machine, and a predetermined amount of electricity is applied thereto. As a result, a polyethylene sheet for foaming in which a foaming agent is molten and kneaded is foamed and, at the same time, the space between adjacent pipes and the space between the pipe and a connection pipe are foamed and then fused.

Conventional electrofusing sheets cannot remove tolerance, thus causing water leakage when the pipe to be connected having the tolerance is connected based on a principle in which the outer surface of the pipe and the polyethylene sheet are melt-fused using electricity. On the other hand, the present invention uses a polyethylene sheet for foaming that removes an acceptable tolerance of the polyethylene pipe, difference in pipe diameter due to variation in circularity of the pipe caused by load during load transportation and an air gap generated in conventional sheet overlapping regions, when a non-foamed sheet foams, and connects the pipe by fusion to provide complete watertightness.

In addition, it was discovered that a foaming temperature of a composition for sheet preparation can be controlled and a sheet that is not foamed during melt extrusion can be thus produced by preparing a master batch comprising a foaming agent and compounding the master batch with a resin to prepare the composition for sheet preparation. It was discovered that water tightness with the pipe can be improved, when the sheet made of this composition is used.

In addition, the present invention is based on the discovery that a foaming level can be controlled, deterioration in physical properties can be prevented and adhesion strength can be improved by mixing a low-density polyethylene in a predetermined amount with a metallocene polyethylene-based resin and a maleic anhydride graft copolymer, and controlling the content of the foaming agent in order to prevent deterioration in physical properties of polyethylene resin when foaming is caused by the foaming agent.

The present invention provides a sheet composition for pipe connection that comprises 1 to 10 parts by weight of a master batch including low-density polyethylene, high-density polyethylene, a maleic anhydride graft copolymer, a metallocene polyethylene-based elastomer, a foaming agent and an additive, with respect to 100 parts by weight of a base resin including low-density polyethylene, high-density polyethylene, a maleic anhydride graft copolymer, and a metallocene polyethylene-based elastomer.

More specifically, the master batch comprises 30 to 50% by weight of low-density polyethylene, 5 to 20% by weight of high-density polyethylene, 10 to 30% by weight of a metallocene polyethylene-based elastomer, 20 to 40% by weight of a maleic anhydride graft copolymer, 1 to 10% by weight of a foaming agent and 0.1 to 5% by weight of an additive.

In addition, the base resin comprises 30 to 50% by weight of low-density polyethylene, 5 to 20% by weight of high-density polyethylene, 10 to 30% by weight of a metallocene polyethylene-based elastomer, and 20 to 40% by weight of a maleic anhydride graft copolymer.

The present invention may further comprise 0.1 to 10% by weight of a vinyl acetate-based resin having a vinyl acetate content of 5 to 30% by weight, if necessary.

In addition, the present invention also includes a method for producing a sheet for electrofoaming fusion using the sheet composition. Specifically, the method includes:

a) weaving a heater line having a zigzag or net shape using a raschel machine;

b) incorporating 1 to 10 parts by weight of a master batch comprising low-density polyethylene, high-density polyethylene, a maleic anhydride graft copolymer, a metallocene polyethylene-based elastomer, a foaming agent and an additive with respect to 100 parts by weight of a base resin including low-density polyethylene, high-density polyethylene, a maleic anhydride graft copolymer, and a metallocene polyethylene-based elastomer, into an extruding machine, and melt-extruding the master batch at a foaming temperature or less to produce a non-foamed sheet; and c) laminating the extruded non-foamed sheet on one or both surfaces of the woven heater line, followed by pressing to integrate the non-foamed sheet with the heater line.

In addition, a connecting apparatus for underground pipes using the sheet for electrofoaming fusion produced by the production method also falls within the scope of the present invention. Specifically, the connecting apparatus includes: a sheet for electrofoaming fusion; a polyethylene support sheet that surrounds the outer surface of the sheet for electrofoaming fusion, is fused to the sheet for electrofoaming fusion and supports a connection portion of the sewer pipes; and a fastening band that adheres the sheet for electrofoaming fusion and the support sheet to the polyethylene sewer pipes, supports the sheet for electrofoaming fusion and the support sheet during foaming and fusion, and hermetically seals the gap of the pipe connection portion or the sheet overlapping portion.

Hereinafter, the present invention will be described with reference to the annexed drawings in more detail.

The sheet composition of the present invention comprises 1 to 10 parts by weight of a master batch comprising low-density polyethylene, high-density polyethylene, a maleic anhydride graft copolymer, a metallocene polyethylene-based elastomer, a foaming agent and an additive, with respect to 100 parts by weight of a base resin comprising low-density polyethylene, high-density polyethylene, a maleic anhydride graft copolymer, and a metallocene polyethylene-based elastomer, thus having a low melting point and superior watertightness with a pipe. Since the sheet composition of the present invention can be melt-fused below a foaming temperature of a foaming agent, the foaming agent is not foamed during production of the sheet. Accordingly, the present invention is characterized in that the non-foamed sheet is produced by laminating the non-foamed sheet to the heater line to produce a sheet for electrofoaming fusion, and heating the sheet for electrofoaming fusion at a foaming temperature or higher of the foaming agent by applying electricity thereto to produce a foamed sheet.

Specifically, the compounded composition of the present invention comprises 30 to 50% by weight of low-density polyethylene, 5 to 20% by weight of high-density polyethylene, 10 to 30% by weight of a metallocene polyethylene-based elastomer, and 20 to 40% by weight of a maleic anhydride graft copolymer.

The low-density polyethylene is used to maintain flexural strength and elasticity. The low-density polyethylene having a melt index (MI) of 2 to 4 g/10 min (190° C., 2.16 kg) is preferred in terms of superior flexural strength and elasticity. The content of the low-density polyethylene is preferably 30 to 50% by weight in terms of improvement in melt flowability during extrusion and decrease in melt temperature.

Use of high-density polyethylene having a melt index (MI) of 20 to 30 g/10 min (190° C., 2.16 kg) is preferred in terms of superior flexural strength and elasticity. The content of the high-density polyethylene is preferably 5 to 20% by weight. When the content exceeds 20% by weight, melting point may increase or sheet flexibility may decrease.

The metallocene polyethylene-based elastomer has a configuration to decrease the melting point of the sheet below a foaming temperature of the foaming agent and improve adhesion and watertightness with pipe during the production of the sheet, and comprises a polyethylene-based elastomer prepared using a metallocene-based catalyst. Specifically, use of a metallocene polyethylene-based elastomer having a melt index (MI) of 1 to 5 g/10 min (190° C., 2.16 kg) is preferred in terms of improvement in adhesion and watertightness. The metallocene polyethylene-based elastomer is added in an amount of 10 to 30% by weight, thereby decreasing the melting point of the resin during sheet extrusion below the foaming temperature of the foaming agent.

The maleic anhydride graft copolymer is used to improve adhesion of the sheet composition, thereby enhancing watertightness with a pipe and miscibility with the foaming agent. The maleic anhydride graft copolymer also enables the foaming agent to be homogeneously distributed in the sheet and thereby to be uniformly foamed. Useful maleic anhydride graft copolymers include maleic anhydride graft low-density polyethylene (MAH-g-LDPE), maleic anhydride graft linear low-density polyethylene (MAH-g-LLDPE), maleic anhydride graft high-density polyethylene (MAH-g-HDPE), maleic anhydride graft ethylene vinyl acetate (MAH-g-EVA) and the like. The maleic anhydride graft copolymer preferably comprises 0.1 to 10 parts by weight of maleic anhydride with respect to a main chain of 100 parts by weight. More preferably, use of the maleic anhydride graft copolymer having a melt index (MI) of 0.7 to 3.5 g/10 min (190° C., 2.16 kg) is preferred in terms of improvement in adhesion and miscibility with the foaming agent. The content is used in an amount of 20 to 40% by weight and adhesion can be improved within this scope.

The present invention may further comprise a vinyl acetate-based resin containing 5 to 30% by weight of vinyl acetate units in order to further improve adhesion. More specifically, an ethylene-vinyl acetate copolymer containing 5 to 30% by weight of vinyl acetate is more preferred. Generally, as the content of vinyl acetate increases, adhesion strength with a material to be adhered improves, and when adhesion strength is excessively high, foaming properties may be deteriorated, and when adhesion strength is excessively low, detachment may disadvantageously readily occur. It is important to determine a suitable content level taking into consideration this point. Accordingly, the content of vinyl acetate is preferably 0.1 to 10% by weight in terms of improvement in adhesion.

Next, the master batch of the present invention will be described. In the present invention, the melting point of resin can be decreased and extrusion property can be further improved by preparing and using an additional master batch without mixing the foaming agent during compounding. The master batch is kneaded in a kneader at 100 to 130° C. for 10 minutes to 6 hours, and then pelletized, thereby improving physical properties of respective resins.

The master batch comprises 30 to 50% by weight of low-density polyethylene, 5 to 20% by weight of high-density polyethylene, 10 to 30% by weight of a metallocene polyethylene-based elastomer, 20 to 40% by weight of a maleic anhydride graft copolymer, 1 to 10% by weight of a foaming agent and 0.1 to 5% by weight of an additive. Here, low-density polyethylene, high-density polyethylene, the metallocene polyethylene-based elastomer and the maleic anhydride graft copolymer are the same as described in the base resin and a more detailed description thereof will thus be omitted.

The foaming agent may use, as a chemical foaming agent, at least one selected from azodicarbonamide (ADCA), azodiisobutyronitrile (ABBN), dinitrosopentamethylenetetramine (DNPT), para-toluenesulfonyl hydrazide (TSH) and oxybis benzenesulfonyl hydrazide (OBSH). Of these, azodicarbonamide (ADCA) is preferred. The foaming temperature of the foaming agent is 165 to 195° C. The content of the foaming agent is determined taking into consideration pipe conditions, that is, type and diameter of pipe. The content of foaming agent used for production of the master batch is preferably 1 to 10% by weight in terms of superior miscibility.

The additive may be one selected from a lubricant, a pigment, an antioxidant, a UV stabilizer, a filler, or a mixture thereof.

Examples of the lubricant as the additive that can be used in the present invention include calcium stearate, zinc stearate, magnesium stearate, aluminum stearate, glycerin stearate, butyl stearate, solid paraffin, liquid paraffin and the like. When the lubricant is added, miscibility of the foaming agent with the resin can be further improved.

The aforementioned sheet composition for pipe connection is prepared in the form of a pellet by mixing 1 to 10 parts by weight of a master batch with respect to 100 parts by weight of a base resin and melt-extruding the mixture using an extruder. At this time, a melt-extrusion temperature should be maintained below a foaming temperature of the foaming agent to obtain a non-foamed sheet. An extrusion temperature to produce a general polyethylene sheet is 200 to 230° C. When extrusion is performed within this range, foaming occurs in the extruder and a non-foamed sheet cannot be produced. Accordingly, the present invention is preferably melt-extruded at a temperature lower than 165 to 195° C., which is a foaming temperature range of the foaming agent.

Next, a method for producing a sheet for electrofoaming fusion using the sheet composition of the present invention will be described.

The method comprises:

a) weaving a heater line having a zigzag or net shape using a raschel machine;

b) incorporating 1 to 10 parts by weight of a master batch comprising low-density polyethylene, high-density polyethylene, a maleic anhydride graft copolymer, a metallocene polyethylene-based elastomer, a foaming agent and an additive, with respect to 100 parts by weight of a base resin including low-density polyethylene, high-density polyethylene, a maleic anhydride graft copolymer, and a metallocene polyethylene-based elastomer, into an extruding machine, and melt-extruding the master batch below a foaming temperature to produce a non-foamed sheet; and c) laminating the extruded non-foamed sheet on one or both surfaces of the woven heater line, followed by pressing to integrate the non-foamed sheet with the heater line.

In addition, if necessary, the sheet for electrofoaming fusion further comprises a temperature sensor disposed between the heater line and the non-foamed sheet.

FIG. 1 illustrates an example of a heater line used in the present invention. According to the present invention, the heater line is preferably made of a metal coated with a glass fiber to prevent short circuit. The production of the heater line is preferably carried out by weaving a zigzag or net shaped mesh to set a heater line inside the sheet for foaming using a raschel machine, to prevent the heater line from being curved in the sheet for foaming, and to maintain the distance and realize uniform foaming. In addition, as shown in FIG. 2, a double portion necessarily occurs in the process of covering the pipe with the sheet during mounting on the pipe widens the distance between the heater lines. It is preferable to prevent the depression of the pipe wall due to excessive temperature. The heater lines may be used in series or parallel depending on the size of pipe.

FIG. 3 illustrates an example of the sheet for electrofoaming fusion according to the present invention. The heater line 10 is woven, the non-foamed sheet 20 of the present invention is melt-fused and, at the same time, laminated to one or both surfaces of the heater line 10, followed by pressing an integrated sheet for electrofoaming fusion 100. As shown in FIG. 3, in order to improve efficiency of fusion and convenience of construction, the sheet for electrofoaming fusion 100 may further comprise a temperature sensor 30. The sheet for electrofoaming fusion 100 comprises the temperature sensor 30, to sense an internal temperature of the sheet in real-time and to transfer temperature information to the fusion machine. A power terminal 40 to apply power is connected to both ends of the heater line 10. That is, the sheet for electrofoaming fusion of the present invention comprises a zigzag or net-shaped heater line 10; a non-foamed sheet 20 that is laminated on one or both surfaces of the heater line and is obtained by melt-extruding the resin composition of the present invention below a foaming temperature of the foaming agent; and a temperature sensor 30 provided between the heater line 10 and the non-foamed sheet 20.

A connecting apparatus of underground pipes using the sheet for electrofoaming fusion produced by the production method also falls within the scope of the present invention. FIG. 4 shows an example of a connecting apparatus of underground pipes according to the present invention. Specifically, FIG. 4(a) shows a state before foaming and fusion and FIG. 4(b) shows a state of foaming and fusion. The connecting apparatus of the underground pipes includes: a sheet for electrofoaming fusion 100; a polyethylene support sheet 200 that surrounds the outer surface of the sheet for electrofoaming fusion and is fused to the sheet for electrofoaming fusion, and supports a connection portion of the sewer pipes; and a fastening band 300 that adheres the sheet for electrofoaming fusion and the support sheet to the polyethylene sewer pipes, supports the sheet for electrofoaming fusion and the support sheet during foaming and fusion, and air-tightly seals the gap of the pipe connection portion or the sheet overlapping portion.

According to the present invention, the polyethylene support sheet 200 is disposed between the sheet for electrofoaming fusion 100 and the fastening band 300 and surrounds the outer surface of the sheet for electrofoaming fusion. The polyethylene support sheet is fused to the sheet for electrofoaming fusion to support the connection portion of the sewer pipes, presses the sheet for electrofoaming fusion to stop foaming after foaming occurs to an extent that the sheet for electrofoaming fusion fills an air gap, thereby controlling a foaming level and reinforcing stiffness. Preferably, sewer pipes with a small opening diameter use a low-density polyethylene resin with superior flexibility and sewer pipes with a large opening diameter use a medium-density polyethylene resin with superior stiffness. The support sheet is provided with a zinc-plated wire mesh or a tire code mesh in order to improve stiffness by exterior pressure and toughness by internal pressure.

In the present invention, the fastening band is preferably a zinc-plated wire mesh (0.5 mm*18 mesh), fastens the sheet for electrofoaming fusion and the polyethylene support sheet to adhere the sheets to the polyethylene pipe, and supports the same during foaming-fusion, thereby hermetically sealing the gap of the pipe connection portion or sheet double portion.

Advantageous Effects

When a sheet for electrofoaming fusion is produced using the sheet composition for pipe connection according to the present invention, the sheet can exhibit superior adhesion with polyethylene pipe and complete watertightness.

In addition, the outer diameter tolerance generated in the production process of polyethylene sewer pipes and difference in pipe diameter caused by circularity variation that may be generated during load transportation can be completely solved through a foaming and fusion process of the polyethylene sheet for foaming. Accordingly, complete watertightness of connection portions can be realized even when using pipes with a difference in pipe diameter.

In addition, the gaps between double portions where sheets overlap, that are necessarily generated when pipes are covered with a sheet, can be completely sealed through a foaming-fusion process, and the distance between heater lines can be varied in a single portion and a double portion and the depression of pipe walls due to excessive temperature increase of the double portion can be prevented. In addition, by using a heater line coated with a glass fiber, short-circuit of heater line can be prevented and reliability of construction can be improved.

BRIEF DESCRIPTION OF THE DRAWINGS

The above and other objects, features and other advantages of the present invention will be more clearly understood from the following detailed description taken in conjunction with the accompanying drawings, in which:

FIG. 4(a) is a cross-sectional view illustrating a state before foaming and FIG. 4(b) is a cross-sectional view illustrating a state of foaming and fusion;

BEST MODE

Figure 1:
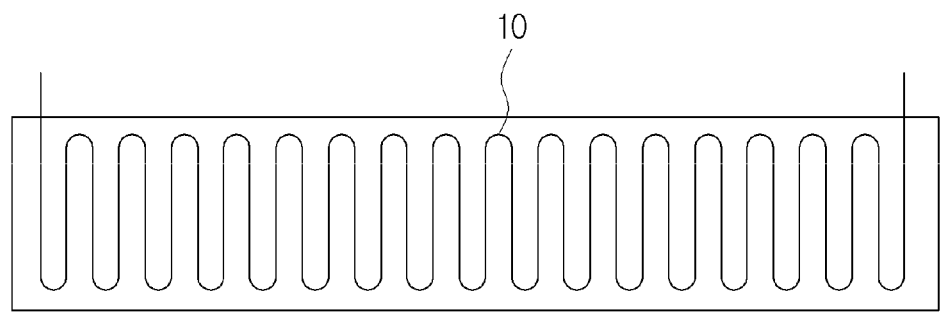
FIG. 1 shows one example of a heater line of the present invention.
Figure 2:
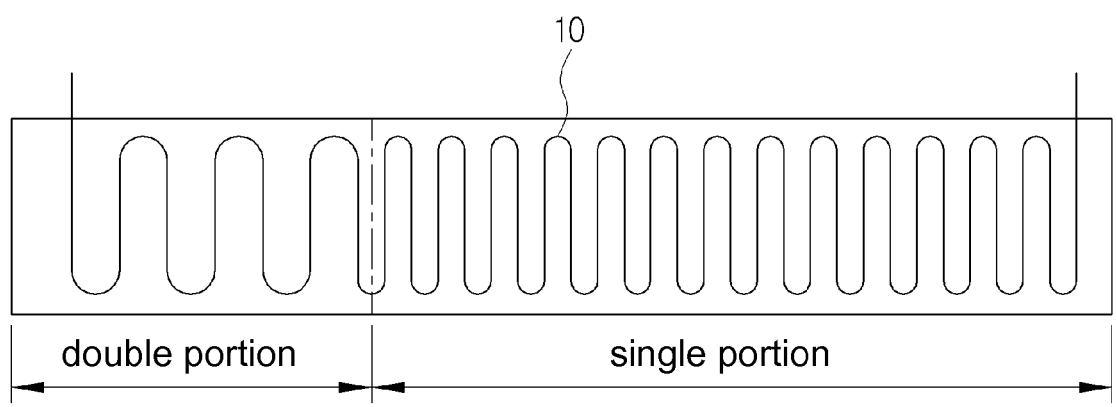
FIG. 2 shows another example of a heater line of the present invention.
Figure 3:
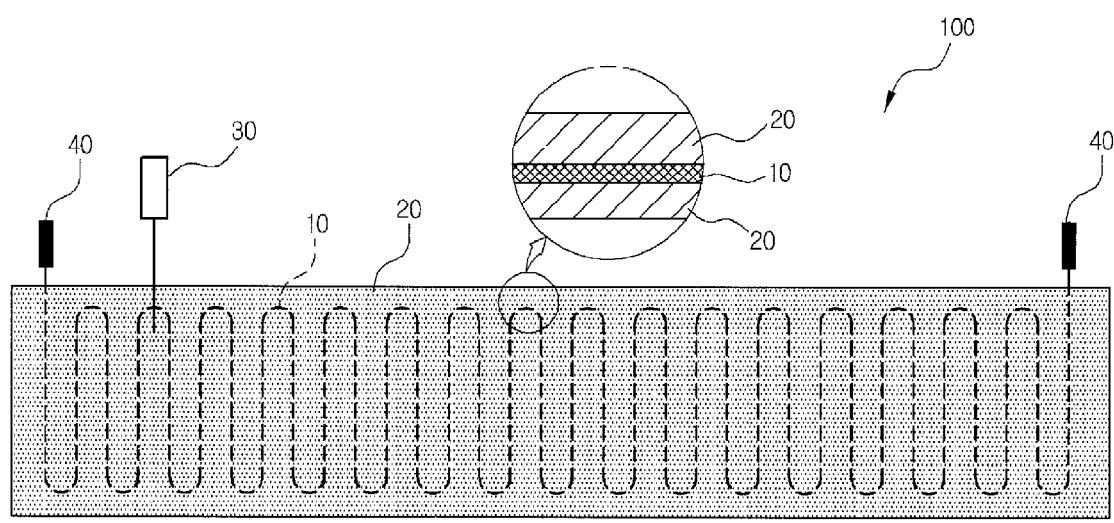
FIG. 3 shows another example of a sheet for electrofoaming fusion of the present invention.
Figure 4:
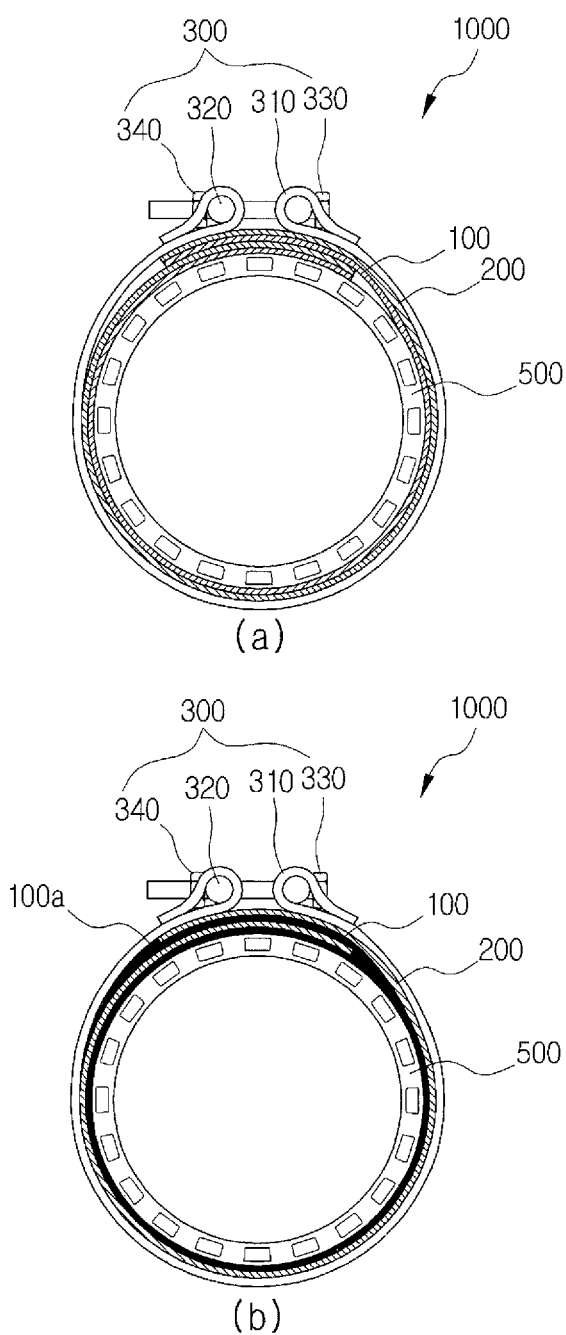
FIG. 4 shows a structure in which a connecting apparatus of underground pipes according to the present invention is mounted to pipes.
Figure 5:
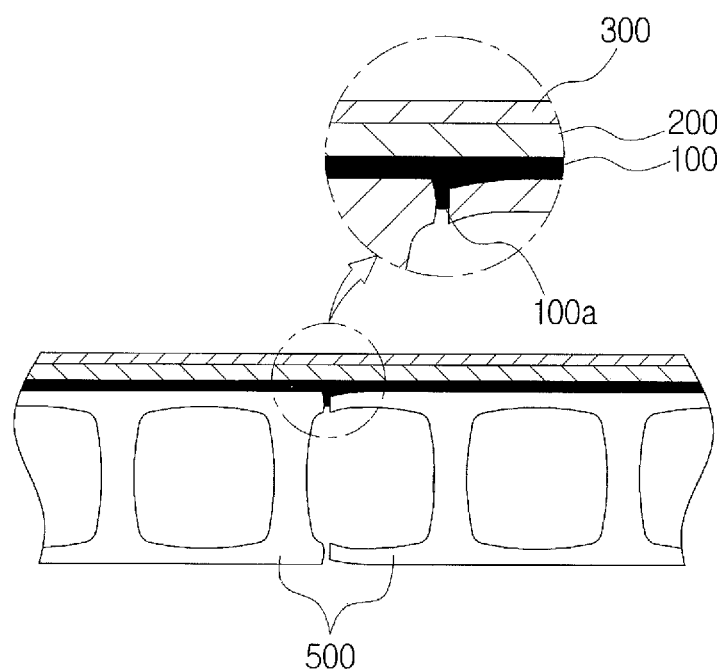
FIG. 5 shows an enlarged cross-sectional view illustrating a state of forming and fusion.
Figure 6:
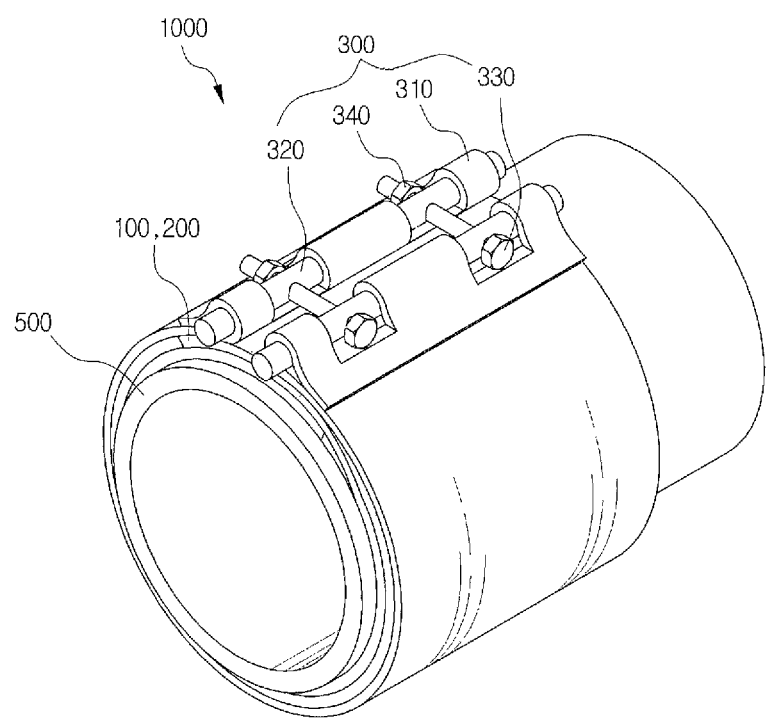
FIG. 6 is a perspective view illustrating a state in which a connecting apparatus of underground pipes according to the present invention is mounted to pipes.

Hereinafter, the present invention will be described in more detail.

Now, the present invention will be described in more detail with reference to the following examples. These examples are only provided to illustrate the present invention and should not be construed as limiting the scope and spirit of the present invention.

Physical properties were measured in accordance with the following method.

A melt index was measured in accordance with ASTM D 1238.

Adhesion and watertightness were evaluated according to the following method. Polyethylene pipes were surrounded with the sheet for electrofoaming fusion produced in Examples and Comparative Examples, and surrounded with a polyethylene support sheet, and the polyethylene pipes were joined using a fastening band, electricity was applied to a heater line and heated to a temperature of 80° C. to foam the sheet for electrofoaming fusion. Watertightness testing was carried out by pressing in accordance with a KPS M 2009 method and confirming water leakage (D1000).

Confirmation of fusion was carried out by observing the cross-section of the fused pipe and confirming whether complete fusion occurred without forming a space portion in a double portion.

EXAMPLE 1

Production of Foaming Agent Master Batch

35% by weight of low-density polyethylene having a melt index of 3 g/10 min (190° C., 2.16 kg) and a density of 0.924g/cm$^3$, 10% by weight of high-density polyethylene having a melt index of 25 g/10 min (190° C., 2.16 kg) and a density of 0.946 g/cm$^3$, 20% by weight of maleic anhydride graft linear low-density polyethylene having a melt index of 2.5 g/10 min(190° C., 2.16 kg) and a density of 0.920 g/cm$^3$, 30% by weight of a metallocene polyethylene-based elastomer having a melt index of 1 g/10 min (190° C., 2.16 kg) and a density of 0.870 g/cm$^3$, 4% by weight of a foaming agent (azodicarbonamide, produced by Dongjin Semichem Co., Ltd.) and 1% by weight of a lubricant (calcium stearate) were incorporated into a kneader, and kneaded at 130° C. for 15 minutes. Then, the resulting substance was melt-extruded at 160° C. in an extruder to produce a foaming agent master batch pellet.

Production of Sheet for Electrofoaming Fusion

As a base resin, 40% by weight of low-density polyethylene having a melt index of 3 g/10 min (190° C., 2.16 kg) and a density of 0.924 g/cm$^3$, 10% by weight of high-density polyethylene having a melt index of 25 g/10 min (190° C., 2.16 kg) and a density of 0.946 g/cm$^3$, 20% by weight of maleic anhydride graft linear low-density polyethylene having a melt index of 2.5 g/10 min (190° C., 2.16 kg) and a density of 0.920 g/cm$^3$, and 30% by weight of a metallocene polyethylene-based elastomer having a melt index of 1 g/10 min (190° C., 2.16 kg) and a density of 0.870 g/cm$^3$ were incorporated into an extruder, 5 parts by weight of the foaming agent master batch pellet produced above was added thereto with respect to 100 parts by weight of the base resin, and the mixture was melt-extruded at 160° C. to produce a sheet through a T-die.

The sheet extruded through the T-die was laminated on both surfaces of the zigzag-shaped heater line woven in the raschel machine, followed by compressing through pressing using a roller to produce a sheet for electrofoaming fusion.

As a result of measurement of physical properties using the physical property measurement method, it was confirmed that the sheet was evenly foamed and completely foamed and fused. Water leakage was not generated in watertightness testing.

EXAMPLE 2

A sheet for electrofoaming fusion was produced in the same manner as in Example 1, except that a maleic anhydride graft linear low-density polyethylene having a melt index of 3 g/10 min (190° C., 2.16 kg) and a density of 0.925 g/cm³ was used as a maleic anhydride graft copolymer.

As a result of measurement of physical properties using the physical property measurement method, it was confirmed that the sheet was evenly foamed and completely foamed and fused. Water leakage was not generated in watertightness testing.

EXAMPLE 3

A sheet for electrofoaming fusion was produced in the same manner as in Example 1, except that the master batch was used in an amount of 10 parts by weight.

As a result of measurement of physical properties using the physical property measurement method, it was confirmed that the sheet was evenly foamed and completely foamed and fused. Water leakage was not generated in watertightness testing.

EXAMPLE 4

A sheet for electrofoaming fusion was produced in the same manner as in Example 1, except that para-toluenesulfonyl hydrazide (TSH, Dongjin Semichem Co., Ltd.) was used as a foaming agent.

As a result of measurement of physical properties using the physical property measurement method, it was confirmed that the sheet was evenly foamed and completely foamed and fused. Water leakage was not generated in watertightness testing.

EXAMPLE 5

Production of Foaming Agent Master Batch

40% by weight of low-density polyethylene having a melt index of 3 g/10 min (190° C., 2.16 kg) and a density of 0.924 g/cm³, 5% by weight of high-density polyethylene having a melt index of 25 g/10 min (190° C., 2.16 kg) and a density of 0.946 g/cm³, 30% by weight of maleic anhydride graft linear low-density polyethylene having a melt index of 2.0 g/10 min (190° C., 2.16 kg) and a density of 0.925 g/cm³, 20% by weight of a metallocene polyethylene-based elastomer having a melt index of 3.0 g/10 min (190° C., 2.16 kg) and a density of 0.875 g/cm³, 4% by weight of a foaming agent (azodicarbonamide, produced by Dongjin Semichem Co., Ltd.) and 1% by weight of a lubricant (calcium stearate) were incorporated into a kneader, and kneaded at 130° C. for 15 minutes. Then, the resulting substance was melt-extruded at 160° C. in an extruder to produce a foaming agent master batch pellet.

Production of Sheet for Electrofoaming Fusion

As a base resin, 30% by weight of low-density polyethylene having a melt index of 3 g/10 min (190° C., 2.16 kg) and a density of 0.924 g/cm³, 20% by weight of high-density polyethylene having a melt index of 25 g/10 min (190° C., 2.16 kg) and a density of 0.946 g/cm³, 30% by weight of maleic anhydride graft linear low-density polyethylene having a melt index of 2.0 g/10 min (190° C., 2.16 kg) and a density of 0.925 g/cm³, and 20% by weight of a metallocene polyethylene-based elastomer having a melt index of 3.0 g/10 min (190° C., 2.16 kg) and a density of 0.875 g/cm³ were compounded in a twin-screw, 5 parts by weight of the foaming agent master batch pellet produced above was added thereto with respect to 100 parts by weight of the base resin, and the mixture was melt-extruded at 160° C. to produce a sheet through a T-die.

The sheet extruded through the T-die was laminated on both surfaces of the zigzag-shaped heater line woven in the raschel machine, followed by compressing through pressing using a roller to produce a sheet for electrofoaming fusion.

As a result of measurement of physical properties using the physical property measurement method, it was confirmed that the sheet was evenly foamed and completely foamed and fused. Water leakage was not generated in watertightness testing.

EXAMPLE 6

Production of Foaming Agent Master Batch

35% by weight of low-density polyethylene having a melt index of 3 g/10 min (190° C., 2.16 kg) and a density of 0.924 g/cm³, 10% by weight of high-density polyethylene having a melt index of 25 g/10 min (190° C., 2.16 kg) and a density of 0.946 g/cm³, 10% by weight of maleic anhydride graft linear low-density polyethylene having a melt index of 2.0 g/10 min (190° C., 2.16 kg) and a density of 0.925 g/cm³, 40% by weight of a metallocene polyethylene-based elastomer having a melt index of 3.0 g/10 min (190° C., 2.16 kg) and a density of 0.875 g/cm³, 4% by weight of a foaming agent (azodicarbonamide, produced by Dongjin Semichem Co., Ltd.) and 1% by weight of a lubricant (calcium stearate) were incorporated into a kneader, and kneaded at 130° C. for 15 minutes. Then, the resulting substance was melt-extruded at 160° C. in an extruder to produce a foaming agent master batch pellet.

Production of Sheet for Electrofoaming Fusion

As a base resin, 40% by weight of low-density polyethylene having a melt index of 3 g/10 min (190° C., 2.16 kg) and a density of 0.924 g/cm³, 10% by weight of high-density polyethylene having a melt index of 25 g/10 min (190° C., 2.16 kg) and a density of 0.946 g/cm³, 10% by weight of maleic anhydride graft linear low-density polyethylene having a melt index of 2.0 g/10 min (190° C., 2.16 kg) and a density of 0.925 g/cm³, and 40% by weight of a metallocene polyethylene-based elastomer having a melt index of 3.0 g/10 min (190° C., 2.16 kg) and a density of 0.875 g/cm³ were compounded in a twin screw, 10 parts by weight of the foaming agent master batch pellet produced above was added thereto with respect to 100 parts by weight of the base resin, and the mixture was melt-extruded at 160° C. to produce a sheet through a T-die.

The sheet extruded through the T-die was laminated on both surfaces of the zigzag-shaped heater line woven in the raschel machine, followed by compressing through pressing using a roller to produce a sheet for electrofoaming fusion.

As a result of measurement of physical properties using the physical property measurement method, it was confirmed that the sheet was evenly foamed and completely foamed and fused. Water leakage was not generated in watertightness testing.

EXAMPLE 7

Production of Foaming Agent Master Batch

35% by weight of low-density polyethylene having a melt index of 3 g/10 min (190° C., 2.16 kg) and a density of 0.924 g/cm³, 10% by weight of high-density polyethylene having a melt index of 25 g/10 min (190° C., 2.16 kg) and a density of 0.946 g/cm³, 30% by weight of maleic anhydride graft linear low-density polyethylene having a melt index of 2.0 g/10 min (190° C., 2.16 kg) and a density of 0.925 g/cm³, 20% by weight of a metallocene polyethylene-based elastomer having a melt index of 3 g/10 min (190° C., 2.16 kg) and a density of 0.875 g/cm³, 4% by weight of a foaming agent (azodicarbonamide, produced by Dongjin Semichem Co., Ltd.) and 1% by weight of a lubricant (calcium stearate) were incorporated into a kneader, and kneaded at 130° C. for 15 minutes. Then, the resulting substance was melt-extruded at 160° C. in an extruder to produce a foaming agent master batch pellet.

Production of Sheet for Electrofoaming Fusion

As a base resin, 40% by weight of low-density polyethylene having a melt index of 3 g/10 min (190° C., 2.16 kg) and a density of 0.924 g/cm³, 10% by weight of high-density polyethylene having a melt index of 25 g/10 min (190° C., 2.16 kg) and a density of 0.946 g/cm³, 30% by weight of maleic anhydride graft linear low-density polyethylene having a melt index of 2.0 g/10 min (190° C., 2.16 kg) and a density of 0.925 g/cm³, and 20% by weight of a metallocene polyethylene-based elastomer having a melt index of 3.0 g/10 min (190° C., 2.16 kg) and a density of 0.875 g/cm³ were compounded in a twin screw, 10 parts by weight of the foaming agent master batch pellet produced above was added thereto with respect to 100 parts by weight of the base resin, and the mixture was melt-extruded at 160° C. to produce a sheet through a T-die.

The sheet extruded through the T-die was laminated on both surfaces of the zigzag-shaped heater line woven in the raschel machine, followed by compressing through pressing using a roller to produce a sheet for electrofoaming fusion.

As a result of measurement of physical properties using the physical property measurement method, it was confirmed that the sheet was evenly foamed and completely foamed and fused. Water leakage was not generated in watertightness testing.

EXAMPLE 8

Production of Foaming Agent Master Batch

30% by weight of low-density polyethylene having a melt index of 3 g/10 min (190° C., 2.16 kg) and a density of 0.924 g/cm³, 5% by weight of high-density polyethylene having a melt index of 25 g/10 min (190° C., 2.16 kg) and a density of 0.946 g/cm³, 30% by weight of maleic anhydride graft linear low-density polyethylene having a melt index of 2.0 g/10 min (190° C., 2.16 kg) and a density of 0.925 g/cm³, 30% by weight of a metallocene polyethylene-based elastomer having a melt index of 3.0 g/10 min (190° C., 2.16 kg) and a density of 0.875 g/cm³, 4% by weight of a foaming agent (azodicarbonamide, produced by Dongjin Semichem Co., Ltd.) and 1% by weight of a lubricant (calcium stearate) were incorporated into a kneader, and kneaded at 130° C. for 15 minutes. Then, the resulting substance was melt-extruded at 160° C. in an extruder to produce a foaming agent master batch pellet.

Production of Sheet for Electrofoaming Fusion

As a base resin, 30% by weight of low-density polyethylene having a melt index of 3 g/10 min (190° C., 2.16 kg) and a density of 0.924 g/cm³, 5% by weight of high-density polyethylene having a melt index of 25 g/10 min (190° C., 2.16 kg) and a density of 0.946 g/cm³, 30% by weight of maleic anhydride graft linear low-density polyethylene having a melt index of 2.0 g/10 min (190° C., 2.16 kg) and a density of 0.925 g/cm³, and 35% by weight of a metallocene polyethylene-based elastomer having a melt index of 3.0 g/10 min (190° C., 2.16 kg) and a density of 0.875 g/cm³ were compounded in a twin screw, 10 parts by weight of the foaming agent master batch pellet produced above was added thereto with respect to 100 parts by weight of the base resin, and the mixture was melt-extruded at 160° C. to produce a sheet through a T-die.

The sheet extruded through the T-die was laminated on both surfaces of the zigzag-shaped heater line woven in the raschel machine, followed by compressing through pressing using a roller to produce a sheet for electrofoaming fusion.

As a result of measurement of physical properties using the physical property measurement method, it was confirmed that the sheet was evenly foamed and completely foamed and fused. Water leakage was not generated in watertightness testing.

EXAMPLE 9

Production of Foaming Agent Master Batch

30% by weight of low-density polyethylene having a melt index of 3 g/10 min (190° C., 2.16 kg) and a density of 0.924 g/cm³, 10% by weight of high-density polyethylene having a melt index of 25 g/10 min (190° C., 2.16 kg) and a density of 0.946 g/cm³, 20% by weight of maleic anhydride graft linear low-density polyethylene having a melt index of 2.0 g/10 min (190° C., 2.16 kg) and a density of 0.925 g/cm³, 25% by weight of a metallocene polyethylene-based elastomer having a melt index of 3 g/10 min (190° C., 2.16 kg) and a density of 0.875 g/cm³, 10% by weight of an ethylene-vinyl acetate copolymer having a melt index of 2.0 g/10 min (190° C., 2.16 kg) and a density of 0.940 g/cm³ and containing 18% by weight of vinyl acetate, 4% by weight of a foaming agent (azodicarbonamide, produced by Dongjin Semichem Co., Ltd.) and 1% by weight of a lubricant (calcium stearate) were incorporated into a kneader, and kneaded at 130° C. for 15 minutes. Then, the resulting substance was melt-extruded at 160° C. in an extruder to produce a foaming agent master batch pellet.

Production of Sheet for Electrofoaming Fusion

As a base resin, 30% by weight of low-density polyethylene having a melt index of 3 g/10 min (190° C., 2.16 kg) and a density of 0.924 g/cm³, 10% by weight of high-density polyethylene having a melt index of 25 g/10 min (190° C., 2.16 kg) and a density of 0.946 g/cm³, 20% by weight of maleic anhydride graft linear low-density polyethylene having a melt index of 2.0 g/10 min (190° C., 2.16 kg) and a density of 0.925 g/cm³, and 30% by weight of a metallocene polyethylene-based elastomer having a melt index of 3.0 g/10 min (190° C., 2.16 kg) and a density of 0.875 g/cm³, 10% by weight of an ethylene-vinyl acetate copolymer having a melt index of 2.0 g/10 min (190° C., 2.16 kg) and a density of 0.940 g/cm³ and containing 18% by weight of vinyl acetate were compounded in a twin screw, 10 parts by weight of the foaming agent master batch pellet produced above was added thereto with respect to 100 parts by weight of the base resin, and the mixture was melt-extruded at 160° C. to produce a sheet through a T-die.

The sheet extruded through the T-die was laminated on both surfaces of the zigzag-shaped heater line woven in the raschel machine, followed by compressing through pressing using a roller to produce a sheet for electrofoaming fusion.

As a result of measurement of physical properties using the physical property measurement method, it was confirmed that the sheet was evenly foamed and completely foamed and fused. Water leakage was not generated in watertightness testing.

EXAMPLE 10

Production of Foaming Agent Master Batch

35% by weight of low-density polyethylene having a melt index of 3 g/10 min (190° C., 2.16 kg) and a density of 0.924 g/cm³, 10% by weight of high-density polyethylene having a melt index of 25 g/10 min (190° C., 2.16 kg) and a density of 0.946 g/cm³, 20% by weight of maleic anhydride graft linear low-density polyethylene having a melt index of 2.0 g/10 min (190° C., 2.16 kg) and a density of 0.925 g/cm³, 25% by weight of a metallocene polyethylene-based elastomer having a melt index of 3 g/10 min (190° C., 2.16 kg) and a density of 0.875 g/cm³, 5% by weight of an ethylene-vinyl acetate copolymer having a melt index of 2.0 g/10 min (190° C., 2.16 kg) and a density of 0.940 g/cm³ and containing 18% by weight of vinyl acetate, 4% by weight of a foaming agent (azodicarbonamide, produced by Dongjin Semichem Co., Ltd.) and 1% by weight of a lubricant (calcium stearate) were incorporated into a kneader, and kneaded at 130° C. for 15 minutes. Then, the resulting substance was melt-extruded at 160° C. in an extruder to produce a foaming agent master batch pellet.

Production of Sheet for Electrofoaming Fusion

As a base resin, 35% by weight of low-density polyethylene having a melt index of 3 g/10 min (190° C., 2.16 kg) and a density of 0.924 g/cm³, 10% by weight of high-density polyethylene having a melt index of 25 g/10 min (190° C., 2.16 kg) and a density of 0.946 g/cm³, 20% by weight of maleic anhydride graft linear low-density polyethylene having a melt index of 2.0 g/10 min (190° C., 2.16 kg) and a density of 0.925 g/cm³, and 30% by weight of a metallocene polyethylene-based elastomer having a melt index of 3.0 g/10 min (190° C., 2.16 kg) and a density of 0.875 g/cm³, 5% by weight of an ethylene-vinyl acetate copolymer having a melt index of 2.0 g/10 min (190° C., 2.16 kg) and a density of 0.940 g/cm³ and containing 18% by weight of vinyl acetate were compounded in a twin screw, 10 parts by weight of the foaming agent master batch pellet produced above was added thereto with respect to 100 parts by weight of the base resin, and the mixture was melt-extruded at 160° C. to produce a sheet through a T-die.

The sheet extruded through the T-die was laminated on both surfaces of the zigzag-shaped heater line woven in the raschel machine, followed by compressing through pressing using a roller to produce a sheet for electrofoaming fusion.

As a result of measurement of physical properties using the physical property measurement method, it was confirmed that the sheet was evenly foamed and completely foamed and fused. Water leakage was not generated in watertightness testing.

COMPARATIVE EXAMPLE 1

Low-density polyethylene having a melt index of 3 g/10 min (190° C., 2.16 kg) and a density of 0.924 g/cm³ was melt-extruded at 200° C. to produce a sheet through a T-die. The sheet extruded through the T-die was laminated on both surfaces of the zigzag-shaped heater line woven in the Raschel machine, followed by compressing through pressing using a roller to produce a sheet for electrofoaming fusion.

Physical properties were measured in the same manner as in Examples using the produced electrofusion sheet. As a result, an air gap was generated in the sheet overlapping portion.

COMPARATIVE EXAMPLE 2

Production of Foaming Agent Master Batch

96% by weight of low-density polyethylene having a melt index of 3 g/10 min (190° C., 2.16 kg) and a density of 0.924 g/cm³ and 4% by weight of a foaming agent (azodicarbonamide, Dongjin Semichem Co., Ltd.) were incorporated in a kneader and kneaded at 130° C. for 15 minutes. Then, the kneaded substance was melt-extruded at 160° C. in an extruder to produce a pellet.

Production of Sheet for Electrofoaming Fusion

As a base resin, 50% by weight of low-density polyethylene having a melt index of 3 g/10 min (190° C., 2.16kg) and a density of 0.924 g/cm³ and 50% by weight of high-density polyethylene having a melt index of 25 g/10 min (190° C., 2.16 kg) and a density of 0.946 g/cm³ were incorporated into a kneader, 5 parts by weight of the foaming agent master batch pellet produced above was added thereto with respect to 100 parts by weight of the base resin, and the mixture was melt-extruded at 200° C. As a result, foaming occurred during extrusion and a sheet was not produced.

COMPARATIVE EXAMPLE 3

Production of Foaming Agent Master Batch

96% by weight of low-density polyethylene having a melt index of 3 g/10 min (190° C., 2.16 kg) and a density of 0.924 g/cm³ and 4% by weight of a foaming agent (azodicarbonamide, Dongjin Semichem Co., Ltd.) were incorporated into a kneader and kneaded at 130° C. for 15 min. Then, the kneaded substance was melt-extruded at 160° C. in an extruder to produce a pellet.

Production of Sheet for Electrofoaming Fusion

As a base resin, 50% by weight of low-density polyethylene having a melt index of 3 g/10 min (190° C., 2.16 kg) and a density of 0.924 g/cm³, and 50% by weight of high-density polyethylene having a melt index of 25 g/10 min (190° C., 2.16 kg) and a density of 0.946 g/cm³ were incorporated into a kneader, 5 parts by weight of the foaming agent master batch pellet produced above was added thereto with respect to 100 parts by weight of the base resin, and the mixture was melt-extruded at 160° C. for 15 min. Then, the kneaded substance was melt-extruded at 160° C. in an extruder to produce a pellet.

The sheet extruded through the T-die was laminated on both surfaces of the zigzag-shaped heater line woven in the raschel machine, followed by compressing through pressing using a roller to produce a sheet for electrofoaming fusion.

As a result of measurement of physical properties using the physical property measurement method, it was confirmed that the sheet was not evenly foamed and an air gap was generated in a sheet overlap portion and water leakage was generated in water tightness testing.

INDUSTRIAL APPLICABILITY

According to the present invention, the space between pipes and the space between a pipe and a connection pipe are foamed and fused in the process of mounting underground pipes, thereby enabling construction using a simple method and providing superior watertightness, thus being highly industrially applicable.

The invention claimed is:

1. A sheet composition for pipe connection comprising:
1 to 10 parts by weight of a master batch comprising 30 to 50% by weight of low-density polyethylene, 5 to 20% by weight of high-density polyethylene, 10 to 30% by weight of a metallocene polyethylene-based elastomer, 20 to 40% by weight of a maleic anhydride graft copolymer, 1 to 10% by weight of a foaming agent and 0.1 to 5% by weight of an additive, with respect to 100 parts by weight of a base resin comprising 30 to 50% by weight of low-density polyethylene, 5 to 20% by weight of high-density polyethylene, 10 to 30% by weight of metallocene polyethylene-based elastomer, and 20 to 40% by weight of maleic anhydride graft copolymer.

2. The sheet composition for pipe connection according to claim 1, wherein the low-density polyethylene has a melt index (MI) of 2 to 4 g/10 min (190, 2.16 kg), the high-density polyethylene has a melt index (MI) of 20 to 30 g/10 min (190, 2.16 kg), the metallocene polyethylene-based elastomer has a melt index (MI) of 1 to 5 g/10 min (190, 2.16 kg), and the maleic anhydride graft copolymer has a melt index (MI) of 0.7 to 3.5 g/10 min (190, 2.16 kg).

3. The sheet composition for pipe connection according to claim 1, wherein the additive is one selected from a lubricant, a pigment, an antioxidant, a UV stabilizer, a filler or a mixture thereof.

4. The sheet composition for pipe connection according to claim 2, wherein the lubricant is one selected from calcium stearate, zinc stearate, magnesium stearate, aluminum stearate, glycerin stearate, butyl stearate, solid paraffin, liquid paraffin, or a mixture thereof.

5. The sheet composition for pipe connection according to claim 1, wherein the foaming agent is one selected from azodicarbonamide (ADCA), azodiisobutyronitrile (ABBN), dinitrosopentamethylenetetramine (DNPT), para-toluenesulfonyl hydrazide (TSH) and oxybis benzenesulfonyl hydrazide (OBSH), or a mixture thereof.

6. The sheet composition for pipe connection according to claim 1, wherein the base resin further comprises 0.1 to 10% by weight of a vinyl acetate-based resin containing 5 to 30% by weight of vinyl acetate.

7. The sheet composition for pipe connection according to claim 6, wherein the vinyl acetate-based resin is an ethylene-vinyl acetate copolymer.

8. The sheet composition for pipe connection according to claim 1, wherein the foaming sheet composition for pipe connection has a foaming temperature of 165 to 195.

9. A method for producing a sheet for electrofoaming fusion using the sheet composition, comprising:
   a) weaving a heater line having a zigzag or net shape using a raschel machine;
   b) incorporating a master batch comprising 30 to 50% by weight of low-density polyethylene, 5 to 20% by weight of high-density polyethylene, 10 to 30% by weight of a metallocene polyethylene-based elastomer, 20 to 40% by weight of a maleic anhydride graft copolymer, 1 to 10% by weight of a foaming agent and 0.1 to 5% by weight of an additive, with respect to 100 parts by weight of a base resin comprising 30 to 50% by weight of low-density polyethylene, 5 to 20% by weight of high-density polyethylene, 10 to 30% by weight of a metallocene polyethylene-based elastomer, and 20 to 40% by weight of a maleic anhydride graft copolymer, into an extruding machine, and melt-extruding the master batch at a foaming temperature or less to produce a non-foamed sheet; and
   c) laminating the extruded non-foamed sheet on one or both surfaces of the woven heater line, followed by pressing to integrate the non-foamed sheet with the heater line.

10. The method according to claim 9, further comprising: a temperature sensor provided between the heater line and the non-foamed sheet.

11. The method according to claim 10, wherein the heater line is coated with a glass fiber.

12. A sheet for electrofoaming fusion produced by the production method according to claim 9, and heated and foamed when current is applied to the heater line.

13. A sheet for electrofoaming fusion comprising:
   a heater line having a zigzag or net shape;
   a non-foamed sheet laminated to one or both surfaces of the heater line and obtained by melt-extruding the composition according to claim 1 at a foaming temperature or less; and
   a temperature sensor provided between the heater line and the non-foamed sheet.

14. A connecting apparatus of underground pipes comprising:
   the sheet for electrofoaming fusion according to claim 13;
   a polyethylene support sheet that surrounds the outer surface of the sheet for electrofoaming fusion, is fused to the sheet for electrofoaming fusion and supports a connection portion of the sewer pipes; and
   a fastening band that adheres the sheet for electrofoaming fusion and the support sheet to the polyethylene sewer pipes, supports the sheet for electrofoaming fusion and the support sheet during foaming and fusion, and hermetically seals the gap of the pipe connection portion or the sheet overlapping portion.

15. The connecting apparatus according to claim 14, wherein the fastening band is of a band clamp-type.

* * * * *